(12) United States Patent
Lin et al.

(10) Patent No.: US 10,853,436 B2
(45) Date of Patent: Dec. 1, 2020

(54) INFORMATION DISPLAY METHOD AND DEVICE

(71) Applicant: Advanced New Technologies Co., Ltd., Grand Cayman (KY)

(72) Inventors: Xiaoqing Lin, Hangzhou (CN); Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/115,003

(22) Filed: Aug. 28, 2018

(65) Prior Publication Data

US 2018/0365330 A1 Dec. 20, 2018

Related U.S. Application Data

(63) Continuation of application No. PCT/CN2017/073914, filed on Feb. 17, 2017.

(30) Foreign Application Priority Data

Feb. 29, 2016 (CN) .......................... 2016 1 0113204

(51) Int. Cl.
| | | |
|---|---|---|
| *G06K 7/10* | (2006.01) | |
| *G06F 16/955* | (2019.01) | |
| *G06Q 30/06* | (2012.01) | |
| *G06K 7/14* | (2006.01) | |
| *G06K 15/00* | (2006.01) | |

(52) U.S. Cl.
CPC .......... *G06F 16/9554* (2019.01); *G06K 7/10* (2013.01); *G06K 7/1417* (2013.01); *G06Q 30/06* (2013.01); *G06K 15/002* (2013.01)

(58) Field of Classification Search
CPC .......... G06K 7/10732; G06K 7/10881; G02B 26/10; G06F 16/9554

USPC .................................................. 235/454, 494
See application file for complete search history.

(56) References Cited

U.S. PATENT DOCUMENTS

| | | | |
|---|---|---|---|
| 2005/0258250 A1 | 11/2005 | Melick et al. | |
| 2006/0097062 A1* | 5/2006 | Cheong | G06K 19/06037 235/494 |
| 2014/0054364 A1* | 2/2014 | Yamauchi | H04N 1/32144 235/375 |
| 2015/0089613 A1 | 3/2015 | Tippett et al. | |

(Continued)

FOREIGN PATENT DOCUMENTS

| | | |
|---|---|---|
| CN | 102063606 | 5/2011 |
| CN | 103401852 | 11/2012 |

(Continued)

OTHER PUBLICATIONS

Extended European Search Report in European Application No. 17759126.0, dated Feb. 12, 2019, 7 pages.

Internatiaonl Search Report issued by the International Searching Authority issued in International Application No. PCT/CN2017/073914 dated May 22, 2017; 11 pages.

(Continued)

*Primary Examiner* — Jamara A Franklin
(74) *Attorney, Agent, or Firm* — Fish & Richardson P.C.

(57) ABSTRACT

First information is received corresponding to a scanned page including a first graphic code. The page is displayed with the first graphic code and an information display page, where the information display page displays the first information. Second information is received corresponding to a scanned page including a second graphic code. The second information is added to the information display page.

17 Claims, 8 Drawing Sheets

(56) References Cited

U.S. PATENT DOCUMENTS

2015/0327069 A1 11/2015 Fu
2016/0072803 A1 3/2016 Holz

FOREIGN PATENT DOCUMENTS

| | | |
|---|---|---|
| CN | 103745186 | 4/2014 |
| CN | 103955660 | 7/2014 |
| CN | 104123520 | 10/2014 |
| CN | 104144058 | 11/2014 |
| CN | 104573604 | 4/2015 |
| CN | 104573605 | 4/2015 |
| CN | 105303143 | 2/2016 |
| CN | 105303148 | 2/2016 |
| JP | 2002329252 | 11/2002 |
| KR | 20120036390 | 4/2012 |
| KR | 20130063045 | 6/2013 |
| KR | 20130102931 | 9/2013 |
| TW | 201601068 | 1/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/073914, dated Sep. 4, 2018, 10 pages (with English translation).
ACT Smartware [online], "Tutorial 9b—Scan modes—Multi Scan | Inventory Scanner X," Jan. 8, 2015, retrieved on Jul. 31, 2020, URL<https://www.youtube.com/watch?v=1AZ1O5G4Idc>, p. 1 [Video Submission].
Pontius [online], "Top 30 Barcode Scanner Apps," Apr. 9, 2014, retrieved on Jul. 14, 2020, URL<https://web.archive.org/web/20140421095932/https://www.camcode.com/asset-tags/top-barcode-scanner-apps/> 35 pages.

* cited by examiner

INFORMATION DISPLAY METHOD AND DEVICE

CROSS-REFERENCE TO RELATED APPLICATIONS

This application is a continuation of PCT Application No. PCT/CN2017/073914, filed on Feb. 17, 2017, which claims priority to Chinese Patent Application No. 201610113204.5, filed on Feb. 29, 2016, and each application is hereby incorporated by reference in its entirety.

TECHNICAL FIELD

The present application relates to the field of Internet technologies, and in particular, to an information display method and device.

BACKGROUND

More and more information scanning functions are applied to online products, especially in online shopping. For example, a user can obtain the product information (product name and unit price) by scanning a two-dimensional code of the product, using a scan tool (for example, "Scan QR code") installed on the mobile phone to complete payment and shopping online.

In the existing technology, a page for scanning (used for scanning a graphic code) and an information display page (used for displaying information obtained after the graphic code is scanned) are usually separated. After the scanning succeeds, the page for scanning jumps to the information display page. However, if the user needs to scan a plurality of graphic codes, an information display page is jumped to immediately after a graphic code is scanned, and when a second graphic code needs to be scanned, a page for scanning needs to be returned to for scanning. Consequently, if a plurality of graphic codes need to be scanned, this process needs to be repeated for each graphic code.

In conclusion, in the existing technology, when there are a plurality of graphic codes to be scanned, scanning efficiency is relatively low.

SUMMARY

Implementations of the present application provide an information display method and device to resolve a problem in the existing technology that when there are a plurality of graphic codes to be scanned, scanning efficiency is relatively low.

To resolve the previous technical problem, the information display method and device provided in the implementations of the present application are implemented below.

An information display method is provided, including the following: receiving first information obtained after a scan box on a page for scanning scans a first graphic code; simultaneously displaying the page for scanning and an information display page and displaying the first information on the information display page; receiving second information obtained after the scan box scans a second graphic code; and adding the second information to the information display page.

An information display method is provided, including the following: receiving first information obtained after a scan box on a page for scanning scans a first graphic code; receiving second information obtained after the scan box scans a second graphic code; and jumping to an information display page when a predetermined condition is satisfied, to display the first information and the second information.

An information display method is provided, including the following: receiving first product information obtained after a scan box on a page for scanning scans a first graphic code; simultaneously displaying the page for scanning and an information display page and displaying the first product information on the information display page; receiving second product information obtained after the scan box scans a second graphic code, where the product information includes a unit price and the number of products; adding the second product information to the information display page; and calculating a total price based on a unit price and the number of products when a payment instruction is received and settling based on the total price.

An information display method is provided, including the following: receiving first product information obtained after a scan box on a page for scanning scans a first graphic code; receiving second product information obtained after the scan box scans a second graphic code, where the product information includes a unit price and the number of products; jumping to an information display page when a predetermined condition is satisfied, to display the first product information and the second product information; and calculating a total price based on a unit price and the number of products when a payment instruction is received and settling based on the total price.

An information display method is provided, including the following: receiving first versitcard information obtained after a scan box on a page for scanning scans a first graphic code; simultaneously displaying the page for scanning and an information display page and displaying the first versitcard information on the information display page; receiving second versitcard information obtained after the scan box scans a second graphic code; adding the second versitcard information to the information display page; and adding users corresponding to the first versitcard information and the second versitcard information as friends when an addition instruction is received.

An information display method is provided, including the following: receiving first versitcard information obtained after a scan box on a page for scanning scans a first graphic code; receiving second versitcard information obtained after the scan box scans a second graphic code; jumping to an information display page when a predetermined condition is satisfied, to display the first versitcard information and the second versitcard information; and adding users corresponding to the first versitcard information and the second versitcard information as friends when an addition instruction is received.

An information display device is provided, including the following: a first receiving unit, configured to receive first information obtained after a scan box on a page for scanning scans a first graphic code; a display unit, configured to simultaneously display the page for scanning and an information display page and display the first information on the information display page; a second receiving unit, configured to receive second information obtained after the scan box scans a second graphic code; and an addition unit, configured to add the second information to the information display page.

An information display device is provided, including the following: a first receiving unit, configured to receive first information obtained after a scan box on a page for scanning scans a first graphic code; a second receiving unit, configured to receive second information obtained after the scan box scans a second graphic code; and a display unit, configured to jump to an information display page when a predetermined condition is satisfied, to display the first information and the second information.

An information display device is provided, including the following: a first receiving unit, configured to receive first product information obtained after a scan box on a page for scanning scans a first graphic code; a first display unit, configured to simultaneously display the page for scanning and an information display page and display the first product information on the information display page; a second receiving unit, configured to receive second product information obtained after the scan box scans a second graphic code, where the product information includes a unit price and the number of products; a second display unit, configured to add the second product information to the information display page; and a payment unit, configured to calculate a total price based on a unit price and the number of products when a payment instruction is received and settle based on the total price.

An information display device is provided, including the following: a first receiving unit, configured to receive first product information obtained after a scan box on a page for scanning scans a first graphic code; a second receiving unit, configured to receive second product information obtained after the scan box scans a second graphic code, where the product information includes a unit price and the number of products; a display unit, configured to jump to an information display page when a predetermined condition is satisfied, to display the first product information and the second product information; and a payment unit, configured to calculate a total price based on a unit price and the number of products when a payment instruction is received and settle based on the total price.

An information display device is provided, including the following: a first receiving unit, configured to receive first versitcard information obtained after a scan box on a page for scanning scans a first graphic code; a first display unit, configured to simultaneously display the page for scanning and an information display page and display the first versitcard information on the information display page; a second receiving unit, configured to receive second versitcard information obtained after the scan box scans a second graphic code; a second display unit, configured to add the second versitcard information to the information display page; and an addition unit, configured to add users corresponding to the first versitcard information and the second versitcard information as friends when an addition instruction is received.

An information display device is provided, including the following: a first receiving unit, configured to receive first versitcard information obtained after a scan box on a page for scanning scans a first graphic code; a second receiving unit, configured to receive second versitcard information obtained after the scan box scans a second graphic code; a display unit, configured to jump to an information display page when a predetermined condition is satisfied, to display the first versitcard information and the second versitcard information; and an addition unit, configured to add users corresponding to the first versitcard information and the second versitcard information as friends when an addition instruction is received.

It can be seen from the technical solutions provided in the implementations of the present application, the terminal can scan a plurality of graphic codes on the page for scanning, jump to the information display page after the predetermined condition is satisfied, and display a plurality of pieces of information simultaneously. As such, efficiency in scanning a plurality of graphic codes is improved. Alternatively, after scanning the graphic code on the page for scanning, the terminal simultaneously displays the page for scanning and the information display page so that the terminal can scan a plurality of graphic codes on the page for scanning, and information obtained by each scan can be added to the information display page in real time to improve efficiency in scanning a plurality of graphic codes.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

To enable a person skilled in the art to better understand the technical solutions in the present application, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
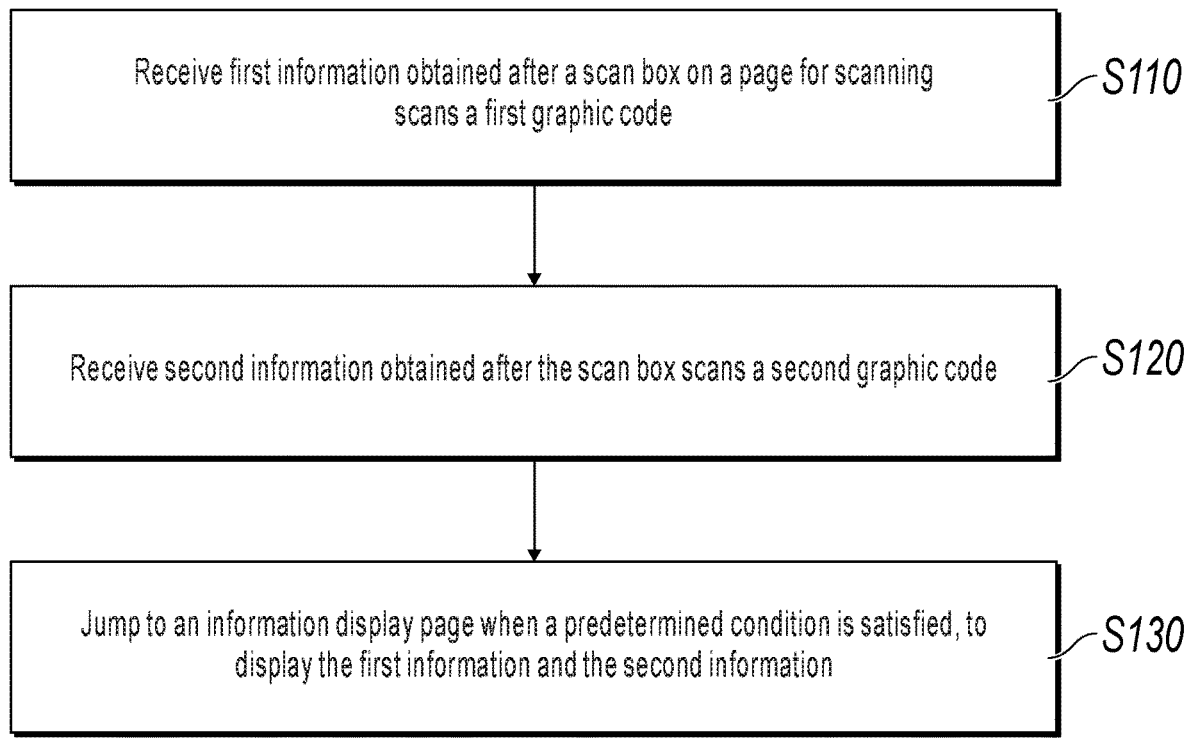
FIG. 1 is a flowchart illustrating an information display method, according to an implementation of the present application.

FIG. 1 is a flowchart illustrating an information display method, according to an implementation of the present application. In this implementation, the information display method includes the following steps.

S110: Receive first information obtained after a scan box on a page for scanning scans a first graphic code.

In actual application, a scan tool for scanning a graphic code can be an application program (App) installed on a terminal. The scan tool can invoke a camera on the terminal, or scan a picture that includes a graphic code to obtain information corresponding to the graphic code. The terminal can include a desktop computer, a laptop computer, a tablet computer, a smartphone, a handheld computer, a personal digital assistant (PDA), or any other device driven by a wired or wireless processor.

The graphic code can include at least one of a two-dimensional code and a barcode. Generally, the graphic code is unique, and each graphic code corresponds to one piece of specific information.

Information is recorded in the two-dimensional code, and the information recorded in the two-dimensional code can be obtained by scanning the two-dimensional code. Generally, a two-dimensional code can be a pattern with black and white geometric figures alternated on a plane (in a two-dimensional direction) according to a certain rule.

Information is recorded in the barcode, and the information recorded in the barcode can be obtained by scanning the barcode. Generally, a barcode is a graphical identifier with a plurality of black lines and spacing that varies in width arranged according to a specific encoding rule to represent a group of information. A common barcode is a pattern of parallel lines formed by black lines (referred to as lines) and white lines (referred to as spacing) with a big reflectivity difference.

Figure 2:
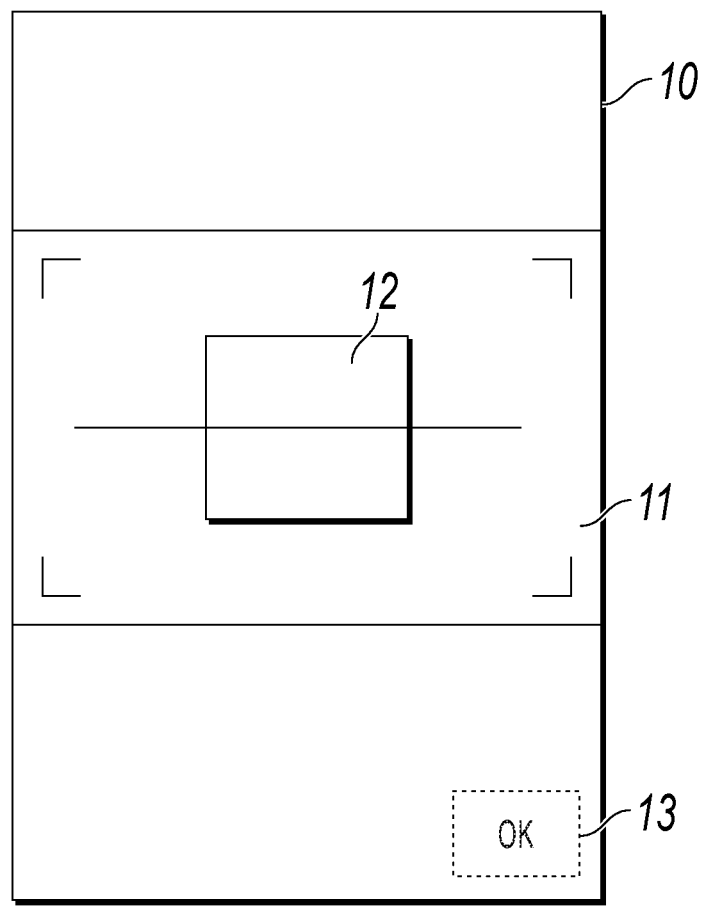
FIG. 2 is a schematic diagram illustrating a page for scanning, according to an implementation of the present application.

An example is used for description below. As shown in FIG. 2, when a user enables a scan tool on a mobile phone, a scan box 11 is displayed on a mobile phone screen 10. A two-dimensional code 12 that needs to be scanned is placed in a scan box for scanning. After the scanning is complete, the information recorded in the two-dimensional code 12 can be obtained.

S120: Receive second information obtained after the scan box scans a second graphic code.

This step is similar to step S110, "first" and "second" are merely for differentiation, and the second graphic code and the first graphic code may be different or may be the same.

S130: Jump to an information display page when a predetermined condition is satisfied, to display the first information and the second information.

In this implementation, the predetermined condition includes the following: predetermined duration expires or a predetermined instruction is received.

Specifically, S130 includes jumping to an information display page when predetermined duration expires, to display the first information and the second information.

The predetermined duration can be a predetermined empirical value. The predetermined duration may start when the scan tool is enabled.

For example, when 20 seconds (the predetermined duration) expires, the information display page is jumped to, to display the first information and the second information, and before 20 seconds expires, the scan box page is still displayed, to continue to receive information obtained after the scan box scans the graphic code.

Specifically, S130 includes jumping to an information display page when a predetermined instruction is received, to display the first information and the second information.

The predetermined instruction is used to control the terminal to jump to the information display page.

Jumping to an information display page when a predetermined instruction is received, to display the first information and the second information includes the following: jumping to an information display page in response to receiving a predetermined instruction generated by a predetermined button triggered on the page for scanning to display the first information and the second information.

Figure 3:
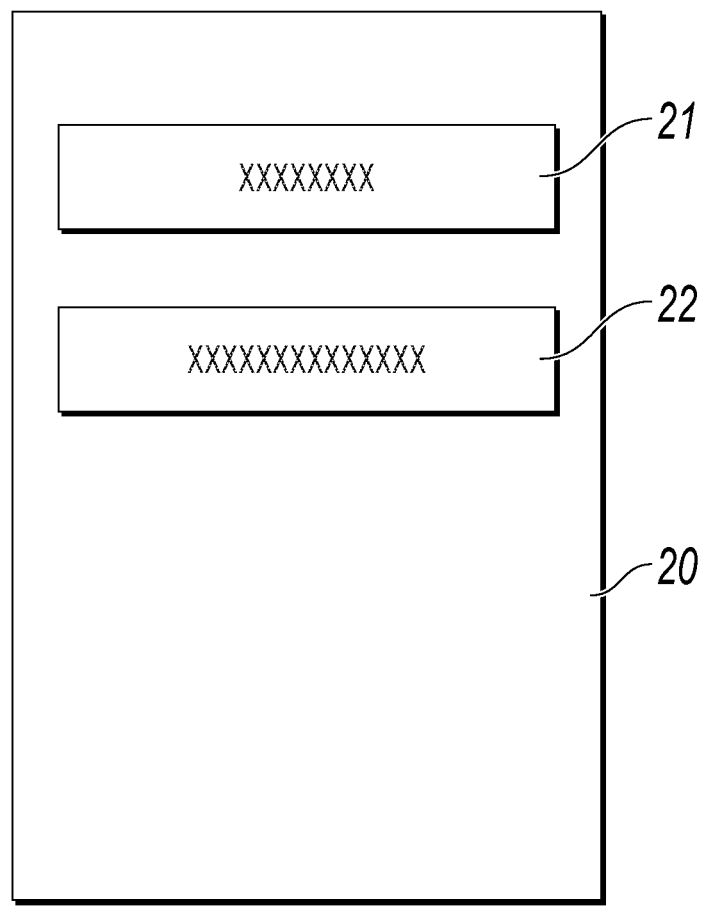
FIG. 3 is a schematic diagram illustrating an information display page, according to an implementation of the present application.

As shown in FIG. 2, a predetermined instruction is generated when the user clicks an OK button (a predetermined button) on the screen. When the terminal receives the predetermined instruction, as shown in FIG. 3, the terminal jumps to the information display page 20 to display the first information 21 and the second information 22 so that the user can view and compare the first information 21 and the second information 22.

In a specific implementation of the present application, jumping to an information display page when a predetermined instruction is received, to display the first information and the second information includes the following: jumping to an information display page in response to receiving a predetermined instruction generated by a sliding module slid on the page for scanning to display the first information and the second information.

According to this implementation, the terminal can scan a plurality of graphic codes on the page for scanning, jump to the information display page after the predetermined condition is satisfied, and display a plurality of pieces of information simultaneously. As such, efficiency in scanning a plurality of graphic codes is improved.

In a specific implementation of the present application, after step S130, the method can further include deleting the first information or the second information on the information display page when an instruction for deleting the first information or the second information is received.

Specifically, the deleting the first information or the second information on the information display page when an instruction for deleting the first information or the second information is received includes displaying a deletion button when it is detected that the information to be displayed is clicked; and deleting the product information after receiving a deletion instruction generated when the deletion button is triggered.

In this implementation, the user can display a deletion button for deleting the information by clicking the first information or the second information on the screen. As such, the user can click the button to delete the first information or the second information. In the example shown in FIG. 3 in the previous implementation, if the user wants to delete the first information 21, the user can click the first information 21, and a deletion button is displayed below the first information 21 on the screen. If the user clicks the deletion button, the first information 21 is deleted. Certainly, if the user does not want to delete the first information 21, the user can click the first information 21 again, and the deletion button is hidden.

Figure 4:
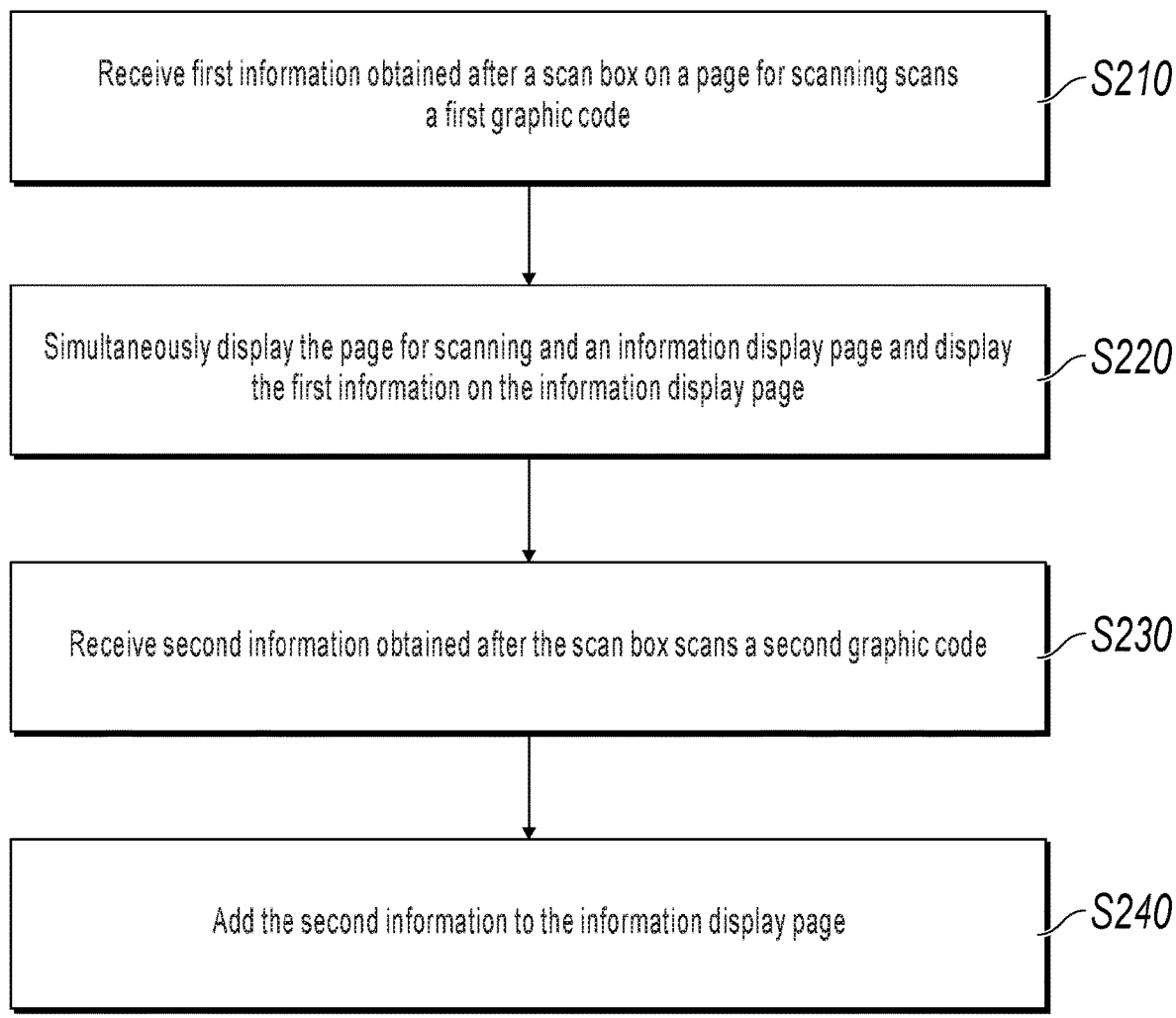
FIG. 4 is a flowchart illustrating an information display method, according to an implementation of the present application.

FIG. 4 is a flowchart illustrating an information display method, according to an implementation of the present application. In this implementation, the information display method includes the following steps.

S210: Receive first information obtained after a scan box on a page for scanning scans a first graphic code.

Step S210 in this implementation is similar to step S110, and details are not described here again.

S220: Simultaneously display the page for scanning and an information display page and display the first information on the information display page.

In this implementation, the simultaneous display can be performed in at least one of a vertical form, a horizontal form, a pop-up window form, and a transparent background form.

The vertical display form may be that the page for scanning is displayed in the upper part of a screen, and the information display page is displayed in the lower part of the screen; or the page for scanning is displayed in the lower part of the screen, and the information display page is displayed in the upper part of the screen.

The horizontal display form may be that the page for scanning is displayed in the left part of the screen, and the information display page is displayed in the right part of the screen; or the page for scanning is displayed in the right part of the screen, and the information display page is displayed in the left part of the screen.

The pop-up window display form may be that the page for scanning is unchanged, and the information display page is displayed in a pop-up window form in a predetermined area on the screen.

The transparent background display form may be changing a background of the page for scanning on the screen into the information display page.

In this implementation, the previous simultaneous display form is merely an example, and the scan box and the information that is to be displayed can be displayed in another form in actual application. It is not limited in this implementation.

Figure 5:
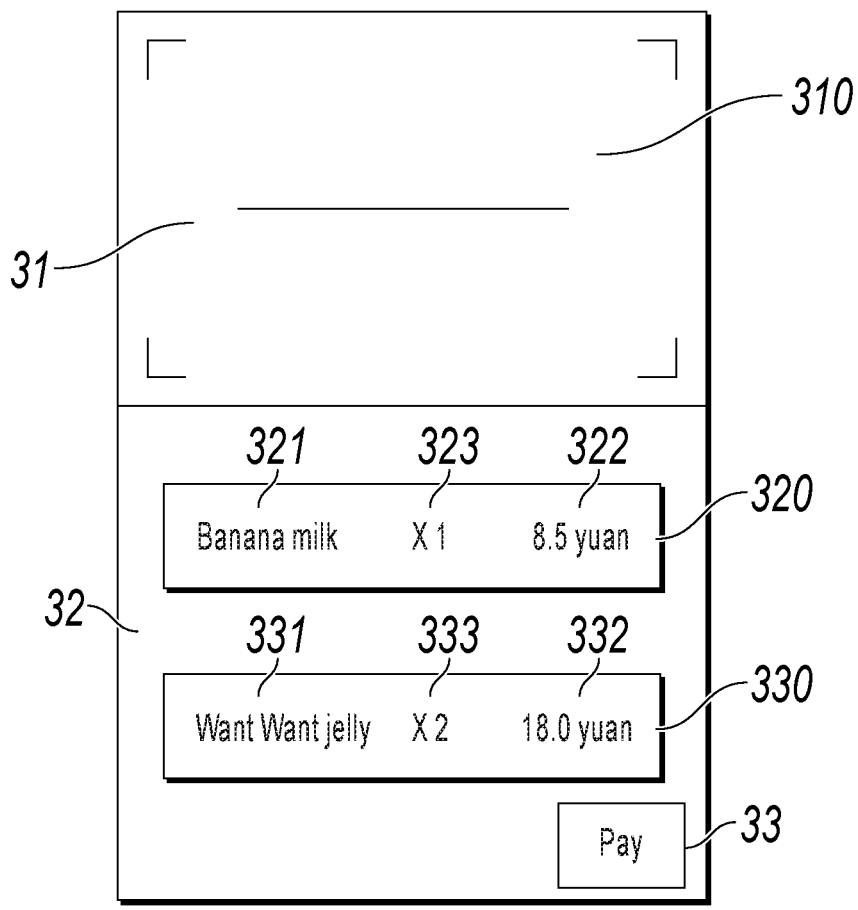
FIG. 5 is a schematic diagram illustrating simultaneous display of a scan box and product information, according to an implementation of the present application.

For example, in the following, the page for scanning in the upper part and the information display page in the lower part are displayed simultaneously. As shown in FIG. 5, after obtaining the first information by scanning the first graphic code, the page for scanning 31 is displayed in the upper part of the screen, and the information display page 32 is displayed in the lower part of the screen. The scan box 310 is still located on the page for scanning 31, and can always scan a graphic code, and the first information 320 is displayed on the information display page 32.

S230: Receive second information obtained after the scan box scans a second graphic code.

This step is similar to step S210, "first" and "second" are merely for differentiation, and the second graphic code and the first graphic code may be different or may be the same.

S240: Add the second information to the information display page.

As shown in FIG. 5, after step S230, the second information 330 is added to the information display page 32 for comparison by the user.

In this implementation, after scanning the graphic code on the page for scanning, the terminal simultaneously displays the page for scanning and the information display page so that the terminal can scan a plurality of graphic codes on the page for scanning. The information obtained by each scan can be added to the information display page in real time to improve efficiency in scanning a plurality of graphic codes.

In a specific implementation of the present application, after step S240, the method can further include deleting the first information or the second information on the information display page when an instruction for deleting the first information or the second information is received.

Specifically, the deleting the first information or the second information on the information display page when an instruction for deleting the first information or the second information is received includes displaying a deletion button when it is detected that the information to be displayed is clicked; and deleting the product information after receiving a deletion instruction generated when the deletion button is triggered.

In this implementation, the user can display a deletion button for deleting the information by clicking the first information or the second information on the screen. As such, the user can click the button to delete the first information or the second information.

A shopping scan scenario is used as an example below to illustrate an information display method corresponding to the previous example shown in FIG. 1. The information display method includes the following: receiving first product information obtained after a scan box on a page for scanning scans a first graphic code; simultaneously displaying the page for scanning and an information display page and displaying the first product information on the information display page; receiving second product information obtained after the scan box scans a second graphic code, where the product information includes a unit price and the number of products; adding the second product information to the information display page; and calculating a total price based on a unit price and the number of products when a payment instruction is received and settling based on the total price.

Figure 6:
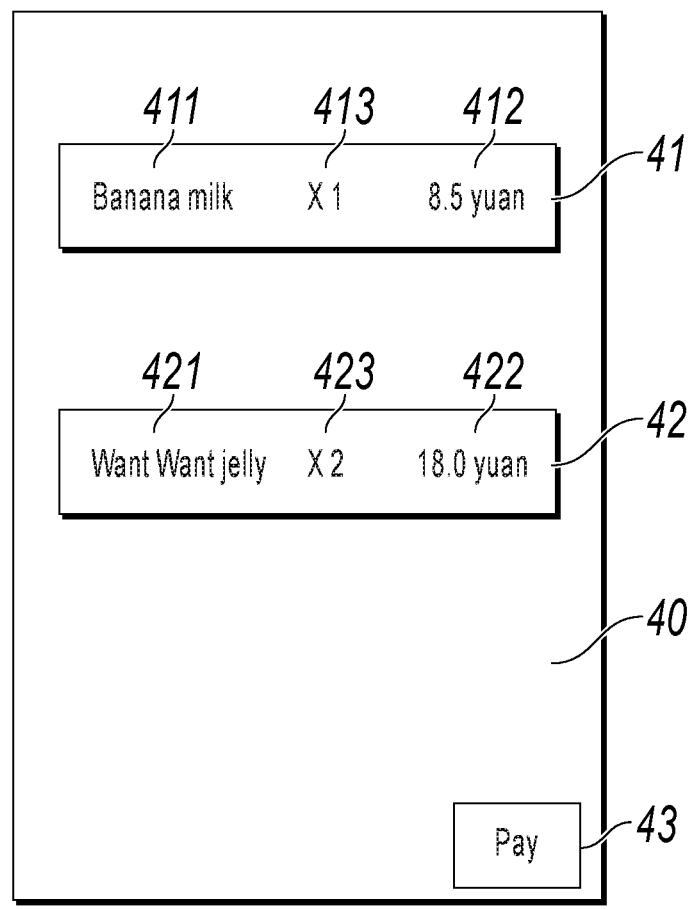
FIG. 6 is a schematic diagram illustrating an information display page in a shopping scan scenario, according to an implementation of the present application.

As shown in FIG. 6, as displayed on the information display page 40, the first product information 41 includes a product name 411, a unit price 412, and the number of products 413, and the second product information 42 includes a product name 421, a unit price 422, and the number of products 423. A payment button 43 is also displayed on the information display page 40. When the user clicks the payment button 43, step S350 is performed, and a total price is 8.5×1+18.0×2=44.5 yuan. The terminal settles based on the total price, namely, 44.5 yuan.

In this implementation, the user can display a plurality of pieces of product information at a time after a plurality of graphic codes are scanned to improve efficiency in scanning a plurality of graphic codes. In addition, a plurality of products are purchased at a time when the terminal receives a payment instruction.

A shopping scan scenario is used as an example below to illustrate an information display method corresponding to the previous example shown in FIG. 4. The information display method includes the following: receiving first product information obtained after a scan box on a page for scanning scans a first graphic code; receiving second product information obtained after the scan box scans a second graphic code, where the product information includes a unit price and the number of products; jumping to an information display page when a predetermined condition is satisfied, to display the first product information and the second product information; and calculating a total price based on a unit price and the number of products when a payment instruction is received and settling based on the total price.

As shown in FIG. 5, the page for scanning 31 is displayed in the upper part of the screen, and the information display page 32 is displayed in the lower part of the screen. As displayed on the information display page 32, the first product information 320 includes a product name 321, a unit price 322, and the number of products 323, and the second product information 330 includes a product name 331, a unit price 332, and the number of products 333. A payment button 33 is also displayed on the information display page 32. When the user clicks the payment button 33, a total price is 8.5×1+18.0×2=44.5 yuan. The terminal settles based on the total price, namely, 44.5 yuan.

In this implementation, after the graphic code is scanned, the user can simultaneously display the page for scanning and the information display page so that the terminal can scan a plurality of graphic codes on the page for scanning. The product information obtained by each scan can be added to the information display page in real time to improve efficiency in scanning a plurality of graphic codes. In addition, a plurality of products are purchased at a time when the terminal receives a payment instruction.

In a flowchart illustrating an information display method according to an implementation of the present application, the information display method includes the following steps: receiving first versitcard information obtained after a scan box on a page for scanning scans a first graphic code; simultaneously displaying the page for scanning and an information display page and displaying the first versitcard information on the information display page; receiving second versitcard information obtained after the scan box scans a second graphic code; adding the second versitcard information to the information display page; and adding users corresponding to the first versitcard information and the second versitcard information as friends when an addition instruction is received.

In this implementation, the user can display a plurality of pieces of versitcard information at a time after a plurality of graphic codes are scanned to improve efficiency in scanning a plurality of graphic codes. In addition, the terminal adds a plurality of friends at a time when receiving an addition instruction.

In a flowchart illustrating an information display method according to an implementation of the present application, the information display method includes the following steps: receiving first versitcard information obtained after a scan box on a page for scanning scans a first graphic code; receiving second versitcard information obtained after the scan box scans a second graphic code; jumping to an information display page when a predetermined condition is satisfied, to display the first versitcard information and the second versitcard information; and adding users corresponding to the first versitcard information and the second versitcard information as friends when an addition instruction is received.

In this implementation, after the graphic code is scanned, the user can simultaneously display the page for scanning and the information display page so that the terminal can scan a plurality of graphic codes on the page for scanning. The versitcard information obtained by each scan can be added to the information display page in real time to improve efficiency in scanning a plurality of graphic codes. In addition, a plurality of friends are added at a time when an addition instruction is received.

An implementation of the present application further provides a device that can implement the previous method steps. The device can be implemented by using software, hardware, or a combination of software and hardware. Software implementation is used as an example. As a logical device, the device is formed by reading a corresponding computer program instruction into a memory through a central processing unit (CPU) of a server.

Figure 7:
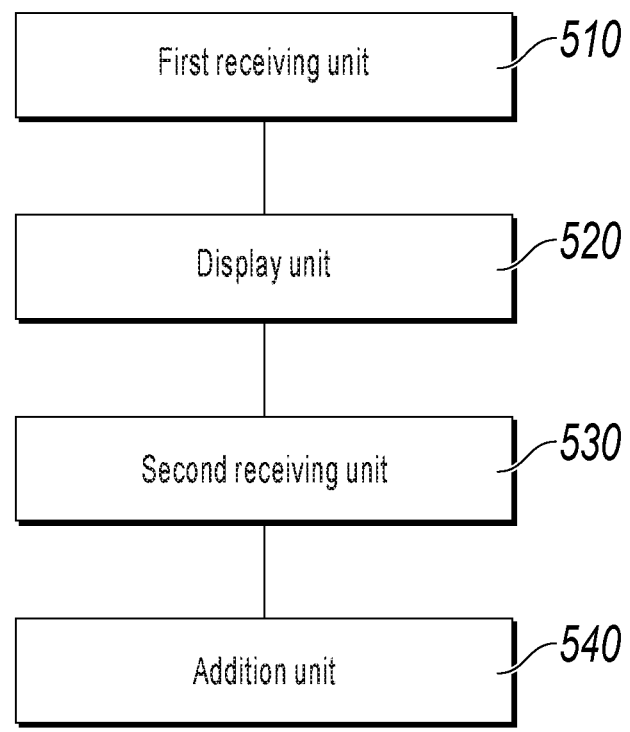
FIG. 7 is a schematic diagram illustrating modules of an information display device, according to an implementation of the present application.

FIG. 7 is a schematic diagram illustrating modules of an information display device, according to an implementation of the present application. In this implementation, the information display device includes the following: a first receiving unit 510, configured to receive first information obtained after a scan box on a page for scanning scans a first graphic code; a display unit 520, configured to simultaneously display the page for scanning and an information display page and display the first information on the information display page; a second receiving unit 530, configured to receive second information obtained after the scan box scans a second graphic code; and an addition unit 540, configured to add the second information to the information display page.

In this implementation, after scanning the graphic code on the page for scanning, the terminal simultaneously displays the page for scanning and the information display page so that the terminal can scan a plurality of graphic codes on the page for scanning. The information obtained by each scan can be added to the information display page in real time to improve efficiency in scanning a plurality of graphic codes.

Preferably, in addition to the addition unit, the device further includes a deletion unit, configured to delete the first information or the second information on the information display page when an instruction for deleting the first information or the second information is received.

Preferably, the deletion unit includes the following: a display sub-unit, configured to display a deletion button when it is detected that the first information or the second information is triggered; and a deletion sub-unit, configured to delete the first information or the second information displayed on the information display page after receiving a deletion instruction generated when the deletion button is triggered.

Preferably, the simultaneous display is performed in at least one of a vertical form, a horizontal form, a pop-up window form, and a transparent background form.

Preferably, the graphic code includes at least one of a two-dimensional code and a barcode.

In a schematic diagram illustrating modules of an information display device according to an implementation of the present application, the information display device includes the following: a first receiving unit, configured to receive first information obtained after a scan box on a page for scanning scans a first graphic code; a second receiving unit, configured to receive second information obtained after the scan box scans a second graphic code; and a display unit, configured to jump to an information display page when a predetermined condition is satisfied, to display the first information and the second information.

According to this implementation, the terminal can scan a plurality of graphic codes on the page for scanning, jump to the information display page after the predetermined condition is satisfied, and display a plurality of pieces of information simultaneously. As such, efficiency in scanning a plurality of graphic codes is improved.

Preferably, the predetermined condition includes the following: predetermined duration expires or a predetermined instruction is received.

Preferably, the display unit includes the following: a display sub-unit, configured to jump to an information display page in response to receiving a predetermined instruction generated by a predetermined button triggered on the page for scanning to display the first information and the second information; or jump to an information display page in response to receiving a display instruction generated by a sliding module slid on the page for scanning to display the first information and the second information.

Preferably, in addition to the display unit, the device further includes a deletion unit, configured to delete the first information or the second information on the information display page when an instruction for deleting the first information or the second information is received.

Preferably, the deletion unit includes the following: a display sub-unit, configured to display a deletion button when it is detected that the first information or the second information is triggered; and a deletion sub-unit, configured to delete the first information or the second information on the information display page after receiving a deletion instruction generated when the deletion button is triggered.

Preferably, the graphic code includes at least one of a two-dimensional code and a barcode.

In a schematic diagram illustrating modules of an information display device according to an implementation of the present application, the information display device includes: a first receiving unit, configured to receive first product information obtained after a scan box on a page for scanning scans a first graphic code; a first display unit, configured to simultaneously display the page for scanning and an information display page and display the first product information on the information display page; a second receiving unit, configured to receive second product information obtained after the scan box scans a second graphic code, where the product information includes a unit price and the number of products; a second display unit, configured to add the second product information to the information display page; and a payment unit, configured to calculate a total price based on a unit price and the number of products when a payment instruction is received and settle based on the total price.

In this implementation, the user can display a plurality of pieces of product information at a time after a plurality of graphic codes are scanned to improve efficiency in scanning a plurality of graphic codes. In addition, a plurality of products are purchased at a time when the terminal receives a payment instruction.

In a schematic diagram illustrating modules of an information display device according to an implementation of the present application, the information display device includes the following: a first receiving unit, configured to receive first product information obtained after a scan box on a page for scanning scans a first graphic code; a second receiving unit, configured to receive second product information obtained after the scan box scans a second graphic code, where the product information includes a unit price and the number of products; a display unit, configured to jump to an information display page when a predetermined condition is satisfied, to display the first product information and the second product information; and a payment unit, configured to calculate a total price based on a unit price and the number of products when a payment instruction is received and settle based on the total price.

In this implementation, after the graphic code is scanned, the user can simultaneously display the page for scanning and the information display page so that the terminal can scan a plurality of graphic codes on the page for scanning. The product information obtained by each scan can be added to the information display page in real time to improve efficiency in scanning a plurality of graphic codes. In addition, a plurality of products are purchased at a time when the terminal receives a payment instruction.

In a schematic diagram illustrating modules of an information display device according to an implementation of the present application, the information display device includes the following: a first receiving unit, configured to receive first versitcard information obtained after a scan box on a page for scanning scans a first graphic code; a first display unit, configured to simultaneously display the page for scanning and an information display page and display the first versitcard information on the information display page; a second receiving unit, configured to receive second versitcard information obtained after the scan box scans a second graphic code; a second display unit, configured to add the second versitcard information to the information display page; and an addition unit, configured to add users corresponding to the first versitcard information and the second versitcard information as friends when an addition instruction is received.

In this implementation, the user can display a plurality of pieces of versitcard information at a time after a plurality of graphic codes are scanned to improve efficiency in scanning a plurality of graphic codes. In addition, the terminal adds a plurality of friends at a time when receiving an addition instruction.

In a schematic diagram illustrating modules of an information display device according to an implementation of the present application, the information display device includes the following: a first receiving unit, configured to receive first versitcard information obtained after a scan box on a page for scanning scans a first graphic code; a second receiving unit, configured to receive second versitcard information obtained after the scan box scans a second graphic code; a display unit, configured to jump to an information display page when a predetermined condition is satisfied, to display the first versitcard information and the second versitcard information; and an addition unit, configured to add users corresponding to the first versitcard information and the second versitcard information as friends when an addition instruction is received.

In this implementation, after the graphic code is scanned, the user can simultaneously display the page for scanning and the information display page so that the terminal can scan a plurality of graphic codes on the page for scanning. The versitcard information obtained by each scan can be added to the information display page in real time to improve efficiency in scanning a plurality of graphic codes. In addition, a plurality of friends are added at a time when an addition instruction is received.

In the 1990s, whether technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by using "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate manner. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented in a manner of pure computer readable program code, and the steps in the method can be logically programmed to enable the controller to implement same functions in forms of a logical gate, a switch, an application-specific integrated circuit, a programmable logic controller, an embedded microcontroller, etc. Therefore, the controller can be considered as a hardware component, and an apparatus configured to implement various functions in the controller can also be considered as a structure in a hardware component. Alternatively, an apparatus configured to implement various functions can be considered as a software module that can implement the method or a structure in a hardware component.

The system, apparatus, module, or unit illustrated in the previous implementations can be implemented by using a computer chip or an entity or can be implemented by using a product having a certain function.

For ease of description, the described apparatus is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a compact disc read-only memory (CD-ROM), and an optical memory) that include computer-usable program code.

The present disclosure is described with reference to the flowcharts and/or block diagrams of the method, the device (system), and the computer program product based on the implementations of the present disclosure. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions are executed by the computer or the processor of another programmable data processing device to generate an apparatus for implementing a specified function in one or more procedures in the flowcharts and/or in one or more blocks in the block diagrams.

These computer program instructions can be stored in a computer readable memory that can instruct the computer or another programmable data processing device to work in a particular way so that the instructions stored in the computer readable memory generate an artifact that includes an instruction apparatus. The instruction apparatus implements a particular function in one or more procedures in the flowcharts and/or in one or more blocks in the block diagrams.

These computer program instructions can be loaded to a computer or another programmable data processing device so that a series of operations and steps are performed on the computer or another programmable device to generate computer-implemented processing. Therefore, the instructions executed on the computer or another programmable device provide steps for implementing a specified function in one or more procedures in the flowcharts and/or in one or more blocks in the block diagrams.

In a typical configuration, a computing device includes one or more processors (CPU), an input/output interface, a network interface, and a memory.

The memory can include a volatile memory, a random access memory (RAM), and/or a nonvolatile memory, etc. in a computer readable medium, such as a read-only memory (ROM) or a flash memory. The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change RAM (PRAM), a static RAM (SRAM), a dynamic RAM (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by a computing device. As described in this specification, the computer readable medium does not include computer readable transitory media, for example, a modulated data signal and a carrier.

It should be further noted that, the term "include", "comprise", or any other variant is intended to cover non-exclusive inclusion, so that a process, a method, a product, or a device that includes a series of elements not only includes these elements, but also includes other elements that are not expressly listed, or further includes elements inherent to such a process, method, product, or device. An element preceded by "includes a . . . " does not, without more constraints, exclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a CD-ROM, and an optical memory) that include computer-usable program code.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations in this specification are described in a progressive way. For same or similar parts in the implementations, refer to the implementations. Each implementation focuses on a difference from other implementations. Particularly, a system implementation is similar to a method implementation, and therefore, is described briefly. For related parts, refer to related descriptions in the method implementation.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

Figure 8:
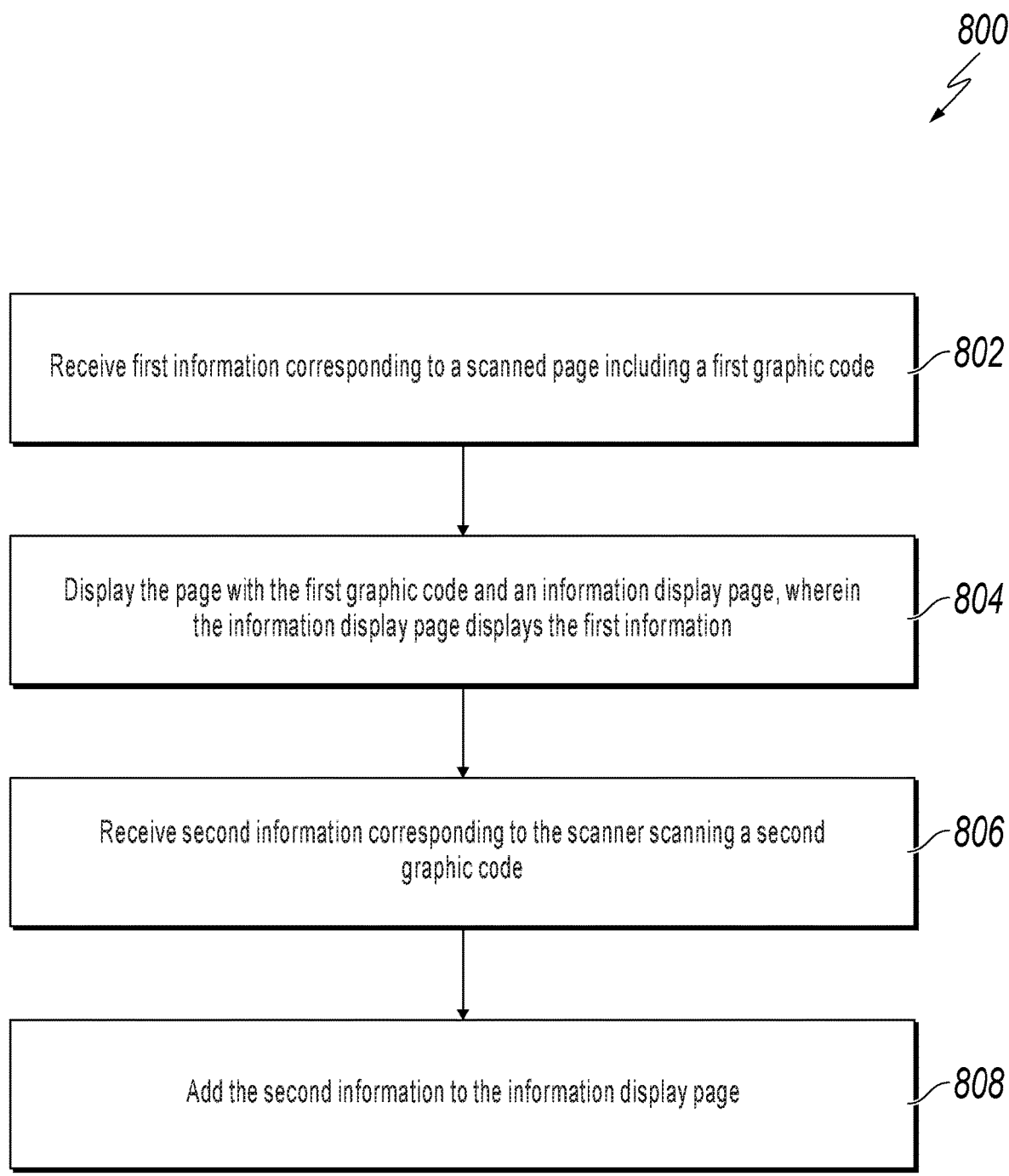
FIG. 8 is a flowchart illustrating an example of a computer-implemented method for efficient scanning of a plurality of graphic codes, according to an implementation of the present disclosure.

FIG. 8 is a flowchart illustrating an example of a computer-implemented method 800 for efficient scanning of a plurality of graphic codes, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, first information is received. The first information corresponds to a scanned page including a first graphic code. From 802, method 800 proceeds to 804.

At 804, the page is displayed with the first graphic code and an information display page, where the information display page displays the first information. In some implementations, the page with the first graphic code and the information display page are displayed simultaneously. In some implementations, the display of the page with the first graphic code and the information display page is in at least one of a vertical form, a horizontal form, a pop-up window form, or a transparent background form. From 804, method 800 proceeds to 806.

At 806, second information is received. The second information corresponds to a scanned page including a second graphic code. In some implementations, either the first graphic code or the second graphic code can comprise a two-dimensional graphic code. From 806, method 800 proceeds to 808.

At 808, the second information is added to the information display page. After 808, method 800 stops.

In some implementations, method 800 can further include: 1) displaying a delete button after displaying the first information or the second information; and 2) deleting the first information or the second information on the information display page after the deletion button is triggered. In some cases method 800 can also further include jumping to the information display page to display the first information and the second information when a predetermined condition is satisfied, where the predetermined condition can include expiration of a predetermined duration or receipt of a predetermined instruction.

It can be seen from the technical solutions provided in the implementations of the present application, the terminal can scan a plurality of graphic codes on the page for scanning, jump to the information display page after the predetermined condition is satisfied, and display a plurality of pieces of information simultaneously. As such, efficiency in scanning a plurality of graphic codes is improved. Alternatively, after scanning the graphic code on the page for scanning, the terminal can simultaneously display the page for scanning and the information display page so that the terminal can scan a plurality of graphic codes on the page for scanning, and information obtained by each scan can be added to the information display page in real time to improve efficiency in scanning a plurality of graphic codes. As a result, computing efficiency can be improved as fewer computing (for example, display, rendering, processing, network, and memory storage) operations need to be performed in order to permit scanning of a plurality of graphic codes.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving, by a terminal device, first information of a first graphic code that is scanned using a scanning page, wherein the scanning page invokes a camera of the terminal device to scan the first graphic code;
    displaying, by the terminal device and on a screen of the terminal device, the scanning page and an information display page simultaneously, wherein the information display page displays the first information;
    receiving, by the terminal device, second information of a second graphic code that is scanned using the scanning page; and
    adding, by the terminal device, the second information to the information display page.

2. The computer-implemented method of claim 1, further comprising:
    displaying a delete button after displaying the first information or the second information; and
    deleting the first information or the second information on the information display page after the delete button is triggered.

3. The computer-implemented method of claim 1, wherein the display of the scanning page and the information display page is in at least one of a vertical form, a horizontal form, a pop-up window form, or a transparent background form.

4. The computer-implemented method of claim 1, wherein a graphic code comprises a two-dimensional graphic code.

5. The computer-implemented method of claim 1, further comprising jumping to the information display page to display the first information and the second information when a predetermined condition is satisfied.

6. The computer-implemented method of claim 5, wherein the predetermined condition comprises expiration of a predetermined duration or receipt of a predetermined instruction.

7. A non-transitory, computer-readable medium storing one or more instructions executable by a computer system to perform operations comprising:
  receiving first information of a first graphic code that is scanned using a scanning page, wherein the scanning page invokes a camera of a terminal device to scan the first graphic code;
  displaying the scanning page and an information display page simultaneously, wherein the information display page displays the first information;
  receiving second information of a second graphic code that is scanned using the scanning page; and
  adding the second information to the information display page.

8. The non-transitory, computer-readable medium of claim 7, wherein the operations further comprise:
  displaying a delete button after displaying the first information or the second information; and
  deleting the first information or the second information on the information display page after the delete button is triggered.

9. The non-transitory, computer-readable medium of claim 7, wherein the display of the scanning page and the information display page is in at least one of a vertical form, a horizontal form, a pop-up window form, or a transparent background form.

10. The non-transitory, computer-readable medium of claim 7, wherein a graphic code comprises a two-dimensional graphic code.

11. The non-transitory, computer-readable medium of claim 7, further comprising one or more instructions to jump to the information display page to display the first information and the second information when a predetermined condition is satisfied.

12. The non-transitory, computer-readable medium of claim 11, wherein the predetermined condition comprises expiration of a predetermined duration or receipt of a predetermined instruction.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform operations comprising:
    receiving first information of a first graphic code that is scanned using a scanning page, wherein the scanning page invokes a camera of a terminal device to scan the first graphic code;
    displaying the scanning page and an information display page simultaneously, wherein the information display page displays the first information;
    receiving second information of a second graphic code that is scanned using the scanning page; and
    adding the second information to the information display page.

14. The computer-implemented system of claim 13, wherein the operations further comprise:
  displaying a delete button after displaying the first information or the second information; and
  deleting the first information or the second information on the information display page after the delete button is triggered.

15. The computer-implemented system of claim 13, wherein the display of the scanning page and the information display page is in at least one of a vertical form, a horizontal form, a pop-up window form, or a transparent background form.

16. The computer-implemented system of claim 13, wherein a graphic code comprises a two-dimensional graphic code.

17. The computer-implemented system of claim 13, further comprising one or more instructions to jump to the information display page to display the first information and the second information when a predetermined condition is satisfied, wherein the predetermined condition comprises expiration of a predetermined duration or receipt of a predetermined instruction.

* * * * *

UNITED STATES PATENT AND TRADEMARK OFFICE
CERTIFICATE OF CORRECTION

PATENT NO. : 10,853,436 B2  
APPLICATION NO. : 16/115003  
DATED : December 1, 2020  
INVENTOR(S) : Xiaoqing Lin and Lindong Liu Page 1 of 1

It is certified that error appears in the above-identified patent and that said Letters Patent is hereby corrected as shown below:

On the Title Page

Column 2, Other Publications, Line 3, delete "Internatiaonl" and insert -- International --, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*